(12) United States Patent
Worrill et al.

(10) Patent No.: US 9,344,684 B2
(45) Date of Patent: May 17, 2016

(54) SYSTEMS AND METHODS CONFIGURED TO ENABLE CONTENT SHARING BETWEEN CLIENT TERMINALS OF A DIGITAL VIDEO MANAGEMENT SYSTEM

(75) Inventors: Joshua Worrill, Newtown (AU); Graeme Laycock, Hunters Hill (AU)

(73) Assignee: Honeywell International Inc., Morris Plains, NJ (US)

( * ) Notice: Subject to any disclaimer, the term of this patent is extended or adjusted under 35 U.S.C. 154(b) by 444 days.

(21) Appl. No.: 13/566,751

(22) Filed: Aug. 3, 2012

(65) Prior Publication Data
US 2013/0036356 A1 Feb. 7, 2013

(30) Foreign Application Priority Data
Aug. 5, 2011 (AU) ................. 2011903151

(51) Int. Cl.
*G06F 3/048* (2013.01)
*H04N 7/18* (2006.01)

(52) U.S. Cl.
CPC ..................... *H04N 7/181* (2013.01)

(58) Field of Classification Search
CPC ..... H04N 21/4788; H04N 7/147; H04N 7/15; H04L 12/1822; H04L 51/04; H04L 65/403; G06F 17/30056; H04M 2250/62
USPC ..................... 715/719
See application file for complete search history.

(56) References Cited

U.S. PATENT DOCUMENTS

| | | |
|---|---|---|
| 3,753,232 A | 8/1973 | Sporer |
| 3,806,911 A | 4/1974 | Pripusich |
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |

(Continued)

FOREIGN PATENT DOCUMENTS

| CA | 2240881 | 12/1999 |
|---|---|---|
| CN | 1265762 | 9/2000 |

(Continued)

OTHER PUBLICATIONS

Gyorfi et al., "Sharing local content with remote clients in a collaborative virtual environment", IPCOM000172771D, Jul. 14, 2008.*

(Continued)

*Primary Examiner* — Jennifer To
*Assistant Examiner* — Joseph R Burwell
(74) *Attorney, Agent, or Firm* — Seager, Tufte & Wickhem, LLP

(57) ABSTRACT

Described herein are systems and methods for managing video data. Embodiments are described by reference to a Digital Video Management (DVM) system, for example methods for facilitating collaborative incident management. In overview, a DVM system provides a user interface, which is renderable at a plurality of client terminal. This allows an operator of each client to independently view DVM content items. In some cases the user interface is provided by components delivered to the clients via a web-server arrangement. The user interface is configured thereby to allow an operator of a first client terminal to provide a request to share a specified DVM content item with the operator of a second client terminal. In response to this request, the content item is delivered to the operator of the second client terminal.

18 Claims, 4 Drawing Sheets

(56) References Cited

U.S. PATENT DOCUMENTS

| | | |
|---|---|---|
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,844,553 A * | 12/1998 | Hao et al. ..................... 715/733 |
| 5,914,875 A | 6/1999 | Monta et al. |
| 5,915,473 A | 6/1999 | Ganesh et al. |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagishi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,283,489 B2 | 10/2007 | Palaez et al. |
| 7,313,819 B2 | 12/2007 | Burnett et al. |
| 7,321,784 B2 | 1/2008 | Serceki et al. |
| 7,337,315 B2 | 2/2008 | Micali |

(56) References Cited

U.S. PATENT DOCUMENTS

| | | |
|---|---|---|
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,408,925 B1 | 8/2008 | Boyle et al. |
| 7,487,538 B2 | 2/2009 | Mok |
| 7,505,914 B2 | 3/2009 | McCall |
| 7,542,867 B2 | 6/2009 | Steger et al. |
| 7,543,327 B1 | 6/2009 | Kaplinsky |
| 7,574,734 B2 | 8/2009 | Fedronic et al. |
| 7,576,770 B2 | 8/2009 | Metzger et al. |
| 7,583,401 B2 | 9/2009 | Lewis |
| 7,586,398 B2 | 9/2009 | Huang et al. |
| 7,600,679 B2 | 10/2009 | Kshirsagar et al. |
| 7,634,662 B2 | 12/2009 | Monroe |
| 7,661,603 B2 | 2/2010 | Yoon et al. |
| 7,683,940 B2 | 3/2010 | Fleming |
| 7,735,132 B2 | 6/2010 | Brown et al. |
| 7,735,145 B2 | 6/2010 | Kuehnel et al. |
| 7,796,536 B2 | 9/2010 | Roy et al. |
| 7,801,870 B2 | 9/2010 | Oh et al. |
| 7,818,026 B2 | 10/2010 | Hartikainen et al. |
| 7,839,926 B1 | 11/2010 | Metzger et al. |
| 7,853,987 B2 | 12/2010 | Balasubramanian et al. |
| 7,861,314 B2 | 12/2010 | Serani et al. |
| 7,873,441 B2 | 1/2011 | Synesiou et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 7,999,847 B2 | 8/2011 | Donovan et al. |
| 8,045,960 B2 | 10/2011 | Orakkan |
| 8,069,144 B2 | 11/2011 | Quinlan et al. |
| 8,089,341 B2 | 1/2012 | Nakagawa et al. |
| 8,095,889 B2 | 1/2012 | DeBlaey et al. |
| 8,102,240 B2 | 1/2012 | Birchbauer et al. |
| 8,108,200 B2 | 1/2012 | Anne et al. |
| 8,166,532 B2 | 4/2012 | Chowdhury et al. |
| 8,179,227 B2 | 5/2012 | Dziadosz |
| 8,199,196 B2 | 6/2012 | Klein et al. |
| 8,222,990 B2 | 7/2012 | Gerner et al. |
| 8,232,860 B2 | 7/2012 | Goel |
| 8,272,053 B2 | 9/2012 | Markham et al. |
| 8,316,407 B2 | 11/2012 | Lee et al. |
| 8,341,695 B2 | 12/2012 | Thomas et al. |
| 8,350,666 B2 | 1/2013 | Kore |
| 8,351,350 B2 | 1/2013 | Bhandari et al. |
| 8,474,029 B2 | 6/2013 | Adams et al. |
| 8,509,987 B2 | 8/2013 | Resner |
| 8,560,970 B2 | 10/2013 | Liddington |
| 8,605,151 B2 | 12/2013 | Bellamy et al. |
| 8,700,714 B1 * | 4/2014 | Pan et al. .................. 709/206 |
| 8,789,094 B1 * | 7/2014 | Singh et al. ............... 348/14.08 |
| 2002/0011923 A1 | 1/2002 | Cunningham et al. |
| 2002/0022991 A1 | 2/2002 | Sharood et al. |
| 2002/0046337 A1 | 4/2002 | Micali |
| 2002/0118096 A1 | 8/2002 | Hoyos et al. |
| 2002/0121961 A1 | 9/2002 | Huff |
| 2002/0165824 A1 | 11/2002 | Micali |
| 2002/0170064 A1 | 11/2002 | Monroe et al. |
| 2003/0033230 A1 | 2/2003 | McCall |
| 2003/0071714 A1 | 4/2003 | Bayer et al. |
| 2003/0174049 A1 | 9/2003 | Beigel et al. |
| 2003/0208689 A1 | 11/2003 | Garza |
| 2003/0233432 A1 | 12/2003 | Davis et al. |
| 2004/0062421 A1 | 4/2004 | Jakubowski et al. |
| 2004/0064453 A1 | 4/2004 | Ruiz et al. |
| 2004/0068583 A1 | 4/2004 | Monroe et al. |
| 2004/0087362 A1 | 5/2004 | Beavers |
| 2004/0205350 A1 | 10/2004 | Waterhouse et al. |
| 2005/0138380 A1 | 6/2005 | Fedronic et al. |
| 2005/0200714 A1 | 9/2005 | Marchese |
| 2006/0017939 A1 | 1/2006 | Jamieson et al. |
| 2006/0092269 A1 * | 5/2006 | Baird et al. ............... 348/14.08 |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0173709 A1 | 7/2008 | Ghosh |
| 2009/0018900 A1 | 1/2009 | Waldron et al. |
| 2009/0080443 A1 | 3/2009 | Dziadosz |
| 2009/0086692 A1 | 4/2009 | Chen |
| 2009/0097815 A1 | 4/2009 | Lahr et al. |
| 2009/0168695 A1 | 7/2009 | Johar et al. |
| 2009/0228808 A1 * | 9/2009 | MacDonald et al. ......... 715/756 |
| 2009/0258643 A1 | 10/2009 | McGuffin |
| 2009/0266885 A1 | 10/2009 | Marcinowski et al. |
| 2009/0292995 A1 | 11/2009 | Anne et al. |
| 2009/0328203 A1 | 12/2009 | Haas |
| 2010/0026811 A1 | 2/2010 | Palmer |
| 2010/0036511 A1 | 2/2010 | Dongare |
| 2010/0064219 A1 * | 3/2010 | Gabrisko et al. ............ 715/716 |
| 2010/0083137 A1 * | 4/2010 | Shin et al. .................. 715/756 |
| 2010/0199340 A1 * | 8/2010 | Jonas et al. ................. 715/758 |
| 2010/0220715 A1 | 9/2010 | Cherchali et al. |
| 2010/0269173 A1 | 10/2010 | Srinvasa et al. |
| 2011/0043631 A1 | 2/2011 | Marman et al. |
| 2011/0071929 A1 | 3/2011 | Morrison |
| 2011/0115602 A1 | 5/2011 | Bhandari et al. |
| 2011/0133884 A1 | 6/2011 | Kumar et al. |
| 2011/0153791 A1 | 6/2011 | Jones et al. |
| 2011/0167488 A1 | 7/2011 | Roy et al. |
| 2011/0181414 A1 | 7/2011 | G. et al. |
| 2011/0193935 A1 * | 8/2011 | Gorzynski ................. 348/14.08 |
| 2011/0225039 A1 * | 9/2011 | Goldman et al. ........... 715/757 |
| 2011/0246908 A1 * | 10/2011 | Akram et al. .............. 715/752 |
| 2011/0283203 A1 * | 11/2011 | Periyannan et al. ......... 715/753 |
| 2012/0096131 A1 | 4/2012 | Bhandari et al. |
| 2012/0106915 A1 | 5/2012 | Palmer |
| 2012/0121229 A1 | 5/2012 | Lee |
| 2012/0133482 A1 | 5/2012 | Bhandari et al. |
| 2012/0326868 A1 | 12/2012 | Goel |
| 2013/0227437 A1 * | 8/2013 | Brody et al. ................. 715/757 |
| 2013/0263021 A1 * | 10/2013 | Dunn et al. ................. 715/756 |
| 2014/0006977 A1 * | 1/2014 | Adams ....................... 715/758 |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | WO 2006/126974 | 11/2006 |
| WO | WO 2007/043798 | 4/2007 |
| WO | WO 2008/045918 | 4/2008 |

(56) References Cited

FOREIGN PATENT DOCUMENTS

| WO | WO 2008/144803 | 12/2008 |
|---|---|---|
| WO | WO 2010/039598 | 4/2010 |
| WO | WO 2010/106474 | 9/2010 |

OTHER PUBLICATIONS

"Use of multiple instant messaging group chats during teleconferences with geographically/culturally/language dispersed teams", IPCOM000194459, Mar. 25, 2010.*

"Method and system for targeted real-time collaborative content sharing across devices", IPCOM000211548, Oct. 11, 2011.*

"Certificate Validation Choices," CoreStreet, Inc., 8 pages, 2002.

"CoreStreet Cuts the PKI Gordian Knot," Digital ID World, pp. 22-25, Jun./Jul. 2004.

"Distributed Certificate Validation," CoreStreet, Ltd., 17 pages, 2006.

"Identity Services Infrastructure," CoreStreet Solutions—Whitepaper, 12 pages, 2006.

"Important FIPS 201 Deployment Considerations," Corestreet Ltd.—Whitepaper, 11 pages, 2005.

"Introduction to Validation for Federated PKI," Corestreet Ltd, 20 pages, 2006.

"Manageable Secure Physical Access," Corestreet Ltd, 3 pages, 2002.

"MiniCRL, Corestreet Technology Datasheet," CoreStreet, 1 page, 2006.

"Nonce Sense, Freshness and Security in OCSP Responses," Corestreet Ltd, 2 pages, 2003.

"Real Time Credential Validation, Secure, Efficient Permissions Management," Corestreet Ltd, 5 pages, 2002.

"The Role of Practical Validation for Homeland Security," Corestreet Ltd, 3 pages, 2002.

"The Roles of Authentication, Authorization & Cryptography in Expanding Security Industry Technology," Security Industry Association (SIA), Quarterly Technical Update, 32 pages, Dec. 2005.

"Vulnerability Analysis of Certificate Validation Systems," Corestreet Ltd—Whitepaper, 14 pages, 2006.

"Keyfast Technical Overview", Corestreet Ltd., 21 pages, 2004.

U.S. Appl. No. 13/566,777, filed Aug. 3, 2012.

Goldman et al., "Information Modeling for Intrusion Report Aggregation," IEEE, Proceedings DARPA Information Survivability Conference and Exposition II, pp. 329-342, 2001.

Honeywell, "Excel Building Supervisor-Integrated R7044 and FS90 Ver. 2.0," Operator Manual, 70 pages, Apr. 1995.

http://www.tcsbasys.com/products/superstats.asp, TCS/Basys Controls: Where Buildings Connect With Business, 2 pages, printed Aug. 26, 2003.

http://www.tcsbasys.com/products/sz1009.asp, TCS/Basys Controls: Where Buildings Connect With Business, 1 page, printed Aug. 26, 2003.

http://www.tcsbasys.com/products/sz1017a.asp, TCS/Basys Controls: Where Buildings Connect With Business, 1 page, printed Aug. 26, 2003.

http://www.tcsbasys.com/products/sz1017n.asp, TCS/Basys Controls: Where Buildings Connect With Business, 1 page, printed Aug. 26, 2003.

http://www.tcsbasys.com/products/sz1020nseries.asp, TCS/Basys Controls: Where Buildings Connect With Business, 2 pages, printed Aug. 26, 2003.

http://www.tcsbasys.com/products/sz1020series.asp, TCS/Basys Controls: Where Buildings Connect With Business, 2 pages, printed Aug. 26, 2003.

http://www.tcsbasys.com/products/sz1022.asp, TCS/Basys Controls: Where Buildings Connect With Business, 2 pages, printed Aug. 26, 2003.

http://www.tcsbasys.com/products/sz1024.asp, TCS/Basys Controls: Where Buildings Connect With Business, 2 pages, printed Aug. 26, 2003.

http://www.tcsbasys.com/products/sz1030series.asp, TCS/Basys Controls: Where Buildings Connect With Business, 2 pages, printed Aug. 26, 2003.

http://www.tcsbasys.com/products/sz1033.asp, TCS/Basys Controls: Where Buildings Connect With Business, 2 pages, printed Aug. 26, 2003.

http://www.tcsbasys.com/products/sz1035.asp, TCS/Basys Controls: Where Buildings Connect With Business, 2 pages, printed Aug. 26, 2003.

http://www.tcsbasys.com/products/sz1041.asp, TCS/Basys Controls: Where Buildings Connect With Business, 1 page, printed Aug. 26, 2003.

http://www.tcsbasys.com/products/sz1050series.asp, TCS/Basys Controls: Where Buildings Connect With Business, 2 pages, printed Aug. 26, 2003.

http://www.tcsbasys.com/products/sz1051.asp, TCS/Basys Controls: Where Buildings Connect With Business, 2 pages, printed Aug. 26, 2003.

http://www.tcsbasys.com/products/sz1053.asp, TCS/Basys Controls: Where Buildings Connect With Business, 2 pages, printed Aug. 26, 2003.

http://wwww.tcsbasys.com/products/sz1031.asp, TCS/Basys Controls: Where Buildings Connect With Business, 2 pages, printed Aug. 26, 2003.

Trane, "System Programming, Tracer Summit Version 14, BMTW-SVP01D-EN," 623 pages, 2002.

U.S. Appl. No. 14/129,086, filed Dec. 23, 2013.

* cited by examiner

SYSTEMS AND METHODS CONFIGURED TO ENABLE CONTENT SHARING BETWEEN CLIENT TERMINALS OF A DIGITAL VIDEO MANAGEMENT SYSTEM

This application claims priority under 35 U.S.C. §119 to Australian (AU) Patent Application No. 2011903151, filed on Aug. 5, 2011. The Australian (AU) Patent Application No. 2011903151, filed on Aug. 5, 2011, is hereby incorporated by reference.

FIELD OF THE INVENTION

The present invention relates to systems and methods for managing video data. Embodiments of the invention have been particularly developed for content sharing and/or collaborative incident management in Digital Video Management (DVM) systems. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Digital Video Management (DVM) systems, such as those based on the Honeywell DVM model, are widely used. Such systems commonly have a plurality of operators working in parallel at respective client terminals. These operators may work collaboratively in times of high activity, for example during significant incidents. However, in known systems, such collaboration typically requires an environment conducive to verbal communication between the operators.

There is a need in the art for improved systems and methods for managing video data.

SUMMARY OF THE INVENTION

It is an object of the present invention to overcome or ameliorate at least one of the disadvantages of the prior art, or to provide a useful alternative.

One embodiment provides a method for operating a DVM system, the method including:

providing a user interface, renderable at a plurality of client terminals, for allowing an operator of each client to independently view DVM content items, wherein the DVM content items include live video data captured by one or more cameras in the DVM system;

by way of the user interface, allowing an operator of a first client terminal to provide a request to share a specified DVM content item with the operator of a second client terminal;

receiving the request from the operator of the first client terminal;

in response to the received request, providing a signal to the second client terminal such that the DVM content item is made available for viewing via the user interface at the second client terminal.

One embodiment provides a DVM system configured to perform a method as described herein.

One embodiment provides a tangible non-transitive carrier medium carrying computer executable code that, when executed via one or more processes, allows the performance of a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing video data. Embodiments are described by reference to a Digital Video Management (DVM) system, for example methods for facilitating collaborative incident management. In overview, a DVM system provides a user interface, which is renderable at a plurality of client terminal. This allows an operator of each client to independently view DVM content items (such as content items including live video data captured by one or more cameras in the DVM system, and video data recorded from one or more cameras in the DVM system). In some cases the user interface is provided by components delivered to the clients via a web-server arrangement. The user interface is configured thereby to allow an operator of a first client terminal to provide a request to share a specified DVM content item with the operator of a second client terminal. In response to this request, the content item is delivered to the operator of the second client terminal. For example, in one scenario the operator of the first terminal views live video data from a particular camera, and determines that the operator of the second terminal should also view that live video data. Accordingly, the operator of the first terminal provides a request to send that live video data to a second terminal, and a DVM server delivers a signal to the second terminal such that the relevant live video data is displayed in a video display object rendered in the user interface of the second terminal.

System Level Overview

Figure 1:
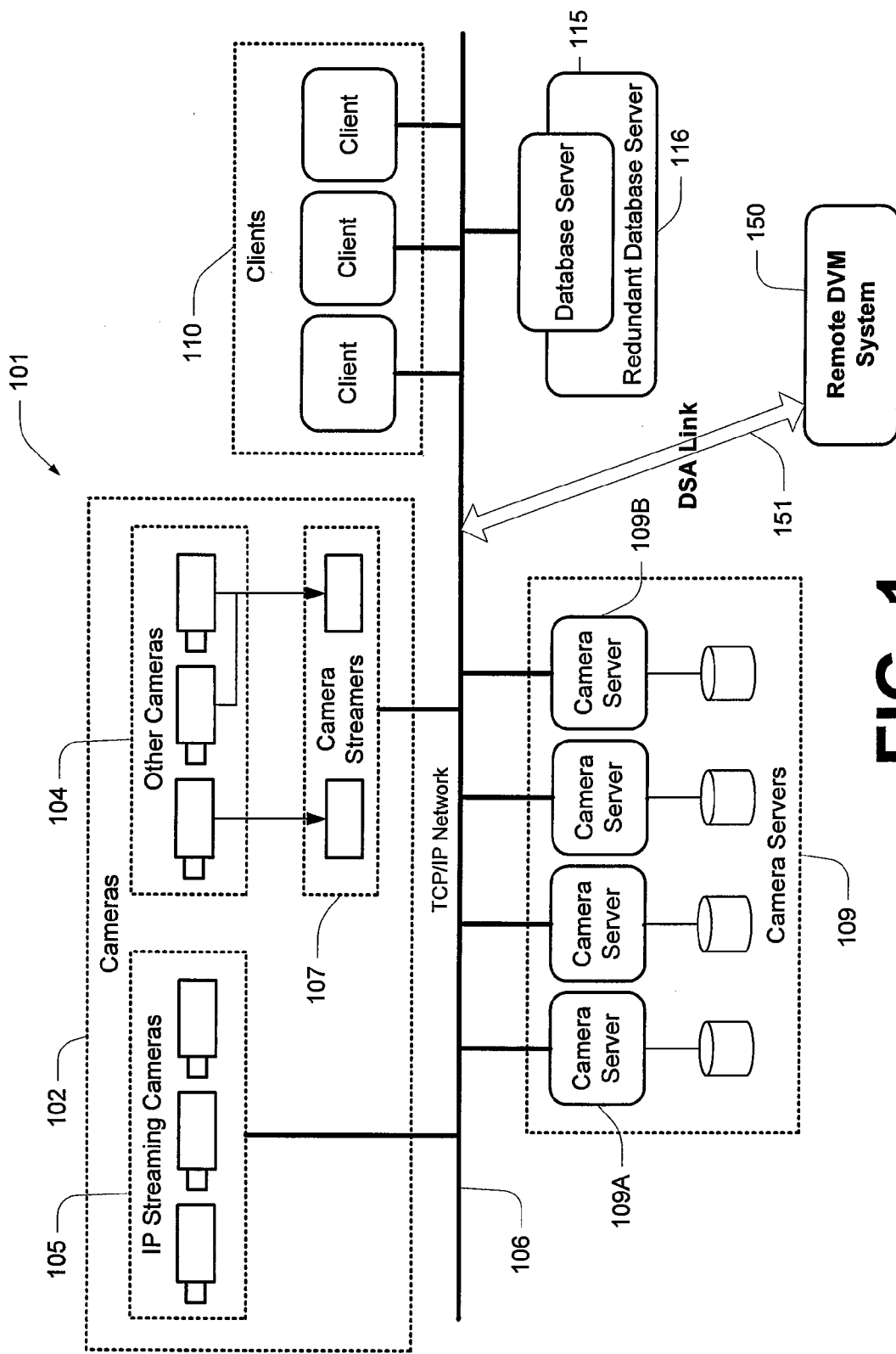
FIG. 1 schematically illustrates a DVM system according to one embodiment.

FIG. 1 illustrates a general Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system. In practice, many systems omit one or more of these features, and/or include additional features.

System 101 includes a plurality of video streaming units 102. Units 102 include conventional cameras 104 (including analogue video cameras) coupled to discrete video streaming units, and IP streaming cameras 105. Video streaming units 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a discrete video streaming unit 107 is required to convert a captured video signal into a format suitable for IP streaming.

For the purposes of the present disclosure, the term "video streaming unit" should be read to include IP streaming cameras 105 and video streaming units 107. That is, the term "video streaming unit" describes any hardware component configured to stream video data onto a network, independent of the source of the originating analogue video data.

For the present purposes, the terms "video streaming unit" and "camera" are generally used interchangeably, on the assumption that each video streaming unit corresponds to a unique set of optical components used to capture video. That is, there is a one-to-one relationship between streaming units 107 and cameras 104. However, in other embodiments there is a one-to-many relationship between streaming units 107 and cameras 104 (i.e. a streaming unit is configured for connection to multiple cameras).

One or more camera servers 109 are also connected to network 106 (these may be either physical servers or virtual servers). Each camera server is enabled to have assigned to it one or more of video streaming units 102. In some embodiments the assignment is on a stream-by-stream basis rather than a camera-by-camera basis. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the relevant streaming unit to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras or streaming units being assigned to a common camera server, this is a conceptual notion, and is essentially no different from a camera server being assigned to one or more cameras or streaming units.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Some embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture). In the context of FIG. 1, a remote system 150, communicates with the local system via a DSA link 151. For the present purposes, it is assumed that remote system 150 is in a general sense similar to the local system. Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

DVM Content Sharing

Figure 2A:
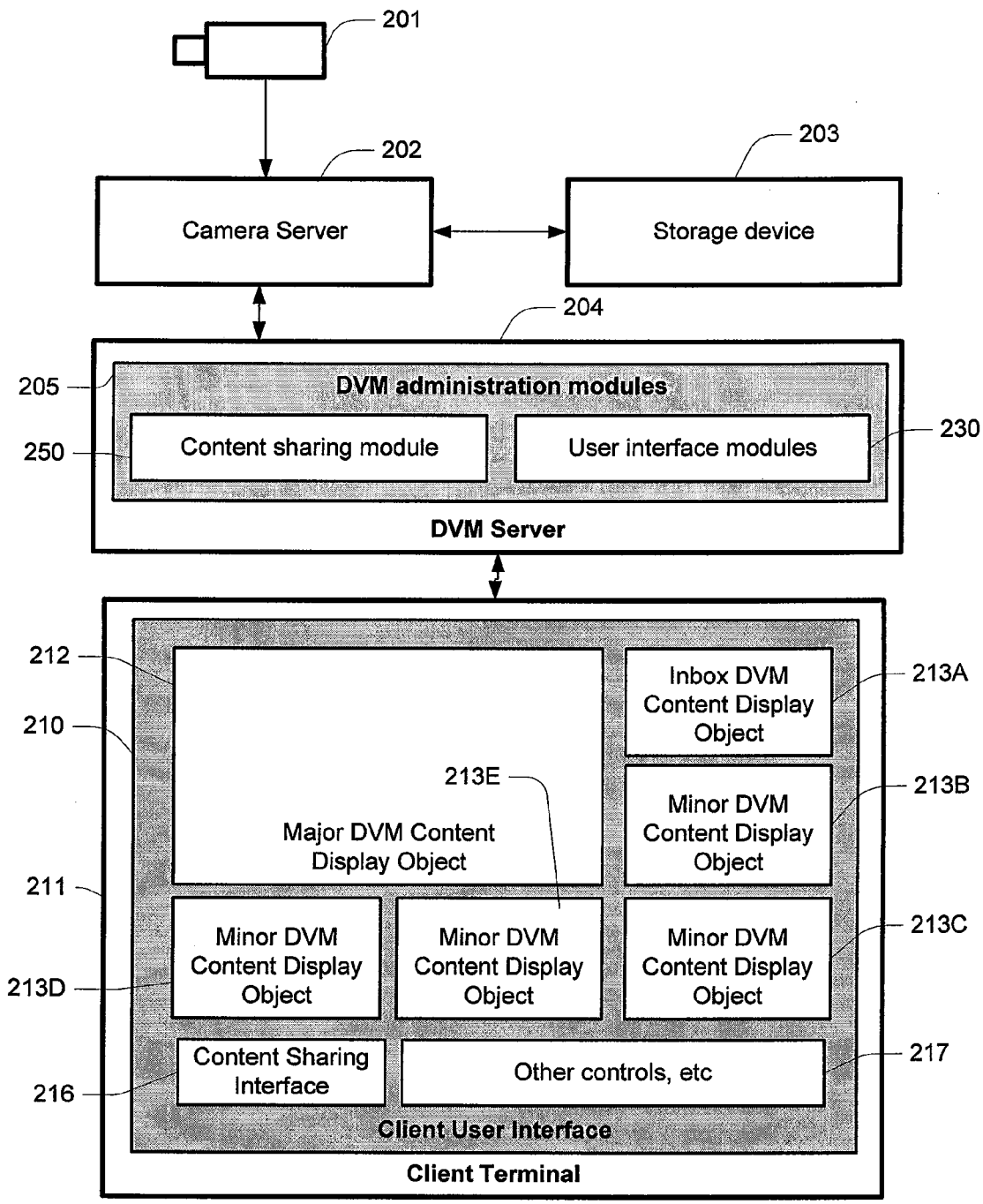
FIG. 2A schematically illustrates a DVM system according to one embodiment.

FIG. 2 illustrates components of an exemplary DVM system (such as the system of FIG. 1), but simplified to illustrate components relevant to DVM content sharing.

A camera 201 is associated with a camera server 202. Camera server 202 is configured to access video data made available by camera 201, either for live viewing or for recording to a storage device 203. Camera server 202 is configured/controlled by a DVM server 204. There may be a large number of cameras and camera servers configured/controlled by DVM server 204.

DVM server 204 executes DVM administration modules 205. The functional block for modules 205 is used to simplistically represent a wide range of software components implemented within a DVM system. Only a selection of these are shown, being user interface modules 230 and a content sharing module 250.

DVM server 204 communicates with a user interface 210 which executes on a client terminal 211. In the present embodiment, this user interface is provided via module 230 via a web-server type arrangement (i.e. user interface 210 is provided via a web-browser at terminal 211 which renders data transmitted by server 211). In this manner, module 230 is configured to allow a plurality of terminals 211 to independently provide respective instantiations user interface 210 for a respective plurality of operators.

User interface 210 is configured to display live and recorded video data to a user via a video display objects (and, in some embodiments, other DVM content such as screenshots, maps, and the like). In the example of FIG. 2, a plurality of display objects are shown as being rendered on-screen simultaneously, including a major display object 212 and minor display objects 213A-E. These are configured to each display live video data from respective cameras (such as camera 201). For the present purposes, minor display object 213A is marked as an "inbox content display object"; the significance of this will be discussed further below. The number of display objects, geometric configuration, sizes and so on is illustrative only, and in some cases varies depending on user preferences and/or other criteria.

User interface 210 additionally includes a content sharing controller 216 and other controls 217 (which simplistically represents a variety of GUI controls available to an operator of terminal 211, such as record control, camera position control, camera view selection, and so on).

The manner by which the content sharing interface operates varies between embodiments. In the embodiment, interface 216 is a "drag and drop" interface, whereby an operator clicks on a content item (such as a content item, optionally being live or recorded video, displayed in any of content items 212 or 213A-E, or a content item otherwise displayed in the main or a popup window at the client terminal), and drags that onto interface 216. The operator is then presented with a pop-up screen which prompts the user to select one or more recipients for the content item (optionally defined in terms of either an operator ID or a terminal ID). This results in data indicative of the content item and recipient/recipients being delivered to content sharing module 250.

Other embodiments adopt different implementations for content sharing interface 216. For example, in one embodiment a user is able to select a content item (for example via a "right-click"), and is presented with a menu to select one or more recipients. In some embodiments additional options are provided, such as the manner of delivery (for example delivery to a major/minor content display object, or to a secondary messaging menu as a link). In some embodiments a user is permitted to simultaneously send multiple content items, for example by "shift-clicking" thereby to select multiple items. In some such cases a multi-object view is able to be sent in its entirety (that is an arrangement of primary and secondary display objects displaying respective specified content items).

Figure 2B:
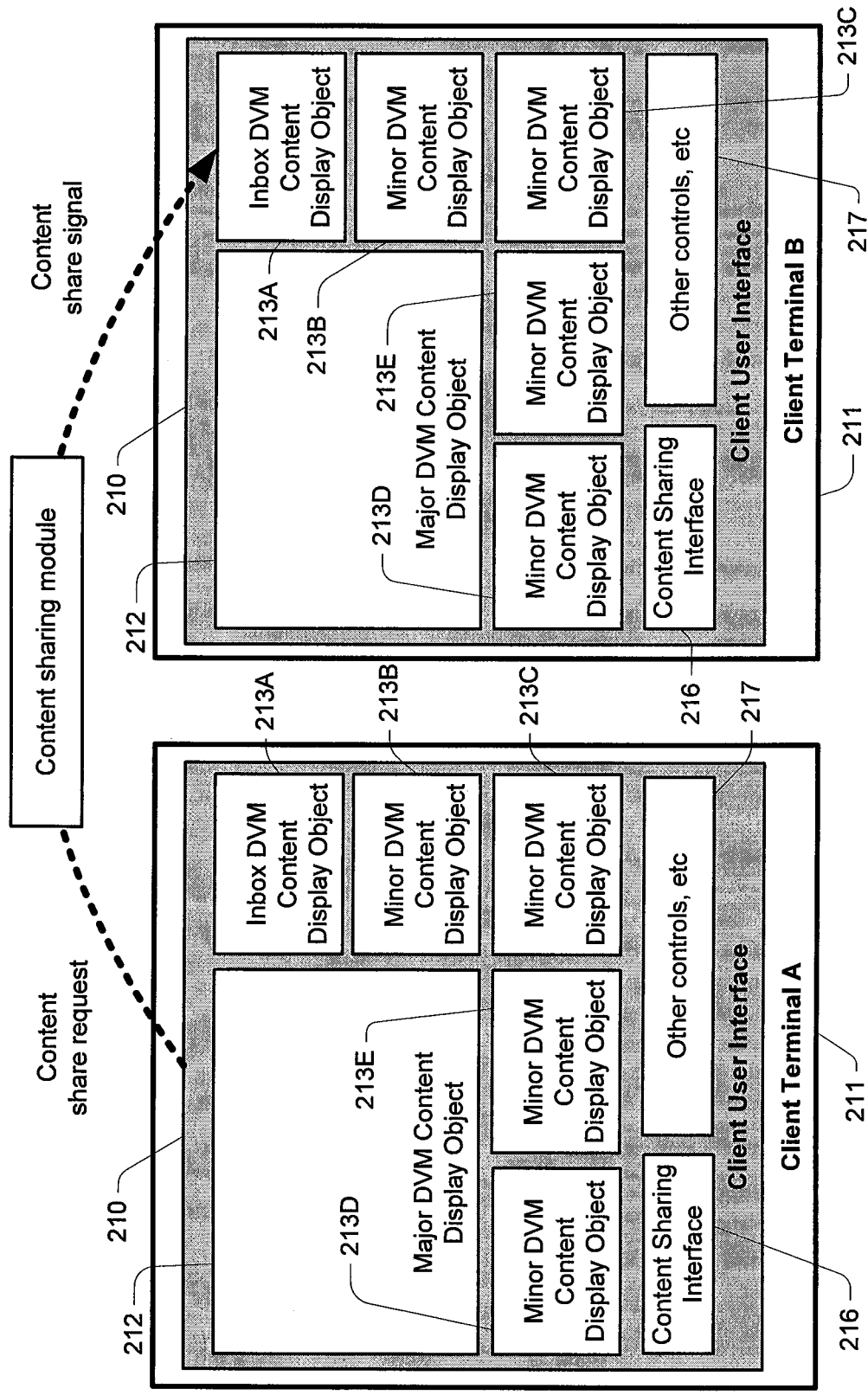
FIG. 2B schematically illustrates a DVM system according to one embodiment.

As shown in FIG. 2B, a content share request (indicative of a content item, one or more recipients, and optionally additional parameters) is delivered from a first client terminal to content sharing module 250. Module 250 then processes that request, thereby to providing a signal to a second client terminal that is identified as a recipient (and, where relevant, further client terminals that are also identified as recipients) such that the relevant DVM content item is made available for viewing via the user interface at the second client terminal (and, where relevant, further client terminals).

The manner by which the signal from module 250 operates varies between embodiments, and in some cases varies depending on settings defined by the operator of the second terminal, and/or parameters defined by the operator of the first terminal when sending the content. For example:

- In some cases, the signal provided to the second client terminal causes the specified DVM content item to be displayed in a content display object of the user interface at the second client terminal. As illustrated, content display item 213A is designated as an inbox display item, such that sent content is initially displayed by object 213A. In some cases a drag-and-drop functionality is provided thereby to allow the user to move that content item to another display object.
- In some cases the signal provides a message to the user to indicate that a content item has been shared, and the user optionally designates a display object via which the content item is to be displayed (optionally via a drag-and-drop mechanic). For example, a sidebar menu shows data indicative of received content items (such as a description of sender and/or the content), and that is dragged and dropped onto a desired content display object.

It will be appreciated that other approaches are used in further embodiments. Furthermore, some embodiments implement an "accept/reject" functionality whereby content items are selectively accepted or rejected by the (or each) recipient. In some cases module 250 provides for a "force push" approach whereby a user with sufficient authorization is able to force a content item to be displayed in the user interface of another terminal (in some cases optionally specifying a particular display object in which it is to be displayed).

In cases where the specified DVM content item is live video captured by a specified camera, and the signal provided to the second client terminal causes the live video captured by the specified camera to be displayed in a video display object of the user interface at the second client terminal. Such a signal is in some cases indicative of an instruction for the second terminal to request connection to the camera server responsible for making available the live video data for the specified camera.

Content sharing module 250 is preferably configured to enable sharing of DVM content including live video data from a specified camera, in combination with one or more other forms of DVM content item, such as still images, a map location image, access card information (such as an access card image captured by the DVM system) or a multiple camera view arrangement.

Figure 3:
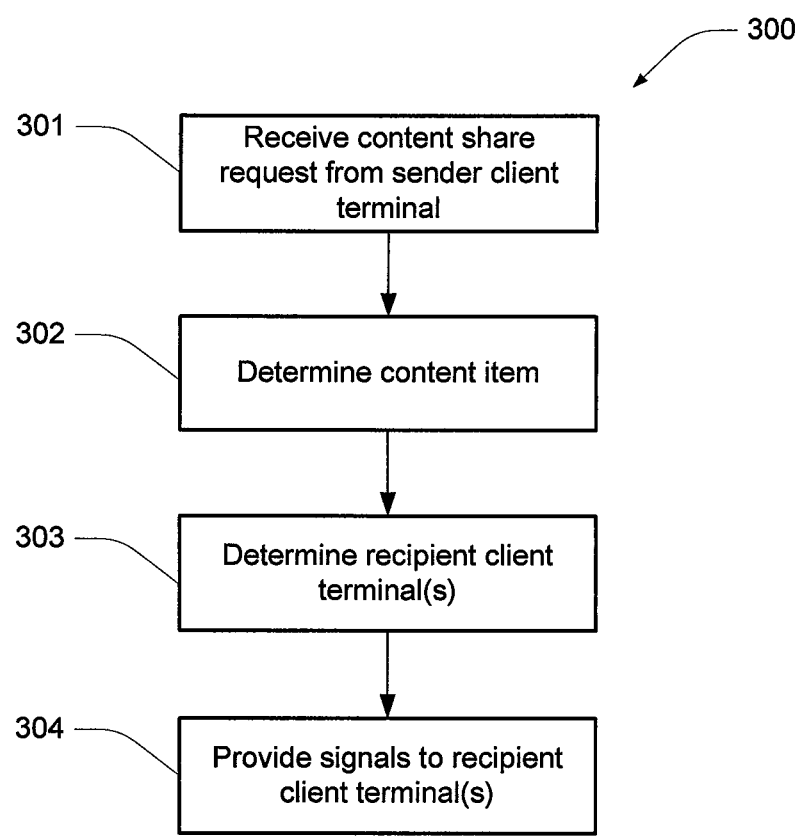
FIG. 3 illustrates a method according to one embodiment.

FIG. 3 illustrates an exemplary method 300 performed by module 250 according to one embodiment. Method 300 includes, at 301, receiving a content share request from a sender client terminal. Module 250 then determines the content item to be shared at 302 and the recipient client terminal (or terminals, for example where the share is by way of a broadcast) at 303. The relevant signals are then provided to the recipient client terminal or terminals at 304.

CONCLUSIONS AND INTERPRETATION

It will be appreciated that the disclosure above provides various significant systems and methods for managing video data. For example, the present embodiments allows for sharing of DVM content between operators, thereby to improve tasks such as collaborative incident management.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for operating a Digital Video Management (DVM) system, the method including:
   providing a user interface, renderable at a plurality of client terminals, for allowing an operator of each client terminal to independently view DVM content items, wherein the DVM content items include live video data captured by one or more cameras in the DVM system;
   rendering an instance of the user interface at a first client terminal, such that an operator of the first client terminal views a plurality of DVM content items, including at least one DVM content display object that displays live video data from a first specific camera, wherein the at least one DVM content display object that displays live video data from the first specific camera is configured to render video data obtained from a first camera server that is configured to make the live video data available over a network;
   rendering an instance of the user interface at a second client terminal, such that an operator of the second client terminal views a plurality of DVM content items, including at least one DVM content display object that displays live video data from a second specific camera, wherein the user interface, when rendered at the second client terminal, is configured to provide a plurality of simultaneously displayed DVM content display objects, wherein each DVM content display object is configurable to display live video data from a respective camera in the DVM system, thereby to enable simultaneous real-time surveillance of multiple physical locations in respect of which the DVM system is configured to provide surveillance;

subject to interaction by the operator of the first client terminal with the at least one DVM content display object that displays live video data from the first specific camera, displaying an interface object configured to allow selection of one or more further users by the operator of the first client terminal with whom to share the live video data from the first specific camera;

receiving, subject to interaction by the operator of the first client terminal with the interface object, a selection indicative of the operator of the second client terminal, thereby to define a request to share the at least one DVM content display object that displays live video data from the first specific camera with the operator of the second client terminal; and in response to the request, providing a signal that causes the instance of the user interface being rendered at the second client terminal to request a connection to the first camera server, such that the user interface at the second client terminal becomes configured to display, via a DVM content display object, live video data from the first specific camera, wherein prior to receiving the signal the second client terminal is not receiving live video data from the first camera server, such that the user interface at the second client terminal provides a plurality of simultaneously displayed DVM content display objects, including two or more DVM content display objects previously configured to display live video data from a respective camera in the DVM system, thereby to enable simultaneous real-time surveillance of multiple physical locations in respect of which the DVM system is configured to provide surveillance, and the DVM content display object configured to display live video data from the first specific camera, such that the second client terminal is configured to enables continued simultaneous surveillance of multiple surveillance regions including a surveillance region monitored by the first specific camera.

2. A method according to claim 1 wherein the signal provided to the second client terminal causes the specified live video data from the first specific camera to be displayed in a DVM content display object of the user interface at the second client terminal.

3. A method according to claim 2 wherein the instance of the user interface being rendered at the second client terminal enables the operator of the second client terminal to select one of a plurality of available display objects in which to view the live video data from the first specific camera.

4. A method according to claim 1 further comprising enabling the operator of the first client terminal to share a further DVM content item to the user interface being rendered at the second client terminal, such that the further DVM content item is displayed in an object rendered at the second client terminal, wherein the further DVM content item is a still image.

5. A method according to claim 1 further comprising enabling the operator of the first client terminal to share a further DVM content item to the user interface being rendered at the second client terminal, such that the further DVM content item is displayed in an object rendered at the second client terminal, wherein the further DVM content item is a map location image.

6. A method according to claim 1 further comprising enabling the operator of the first client terminal to share a further DVM content item to the user interface being rendered at the second client terminal, such that the further DVM content item is displayed in an object rendered at the second client terminal, wherein the further DVM content item is access card information.

7. A method according to claim 1 further comprising enabling the operator of the first client terminal to share a further DVM content item to the user interface being rendered at the second client terminal, such that the further DVM content item is displayed in an object rendered at the second client terminal, wherein the further DVM content item is video data recorded from one or more cameras in the DVM system.

8. A method according to claim 1 wherein the operator of the second terminal manually accepts or rejects the signal.

9. A method according to claim 1 wherein the operator of the second terminal selects an on-screen content display object for displaying a content item shared by the operator of the first client terminal.

10. A method according to claim 1 wherein, by way of the user interface, the operator of the first client terminal is enabled to provide a request to share a specified DVM content item with the operator of the second client terminal and the operators of one or more further client terminals.

11. A Digital Video Management (DVM) system comprising:

a first client terminal that renders an instance of a user interface, wherein the user interface is renderable at a plurality of client terminals thereby to allow the operator of each client to independently view DVM content items, wherein the DVM content items include live video data captured by one or more cameras in the DVM system, wherein the rendering at the first client terminal is configured such that an operator of the first client terminal views a plurality of DVM content items, including at least one DVM content display object that displays live video data from a first specific camera, wherein the at least one DVM content display object that displays live video data from a first specific camera is configured to render video data obtained from a first camera server that is configured to make the live video data available over a network;

a second client terminal that renders a second instance of the user interface, such that an operator of the second client terminal views a plurality of DVM content items, including at least one DVM content display object that displays live video data from a second specific camera, wherein the user interface, when rendered at the second client terminal, is configured to provide a plurality of simultaneously displayed DVM content display objects, wherein each DVM content display object is configurable to display live video data from a respective camera in the DVM system, thereby to enable simultaneous real-time surveillance of multiple physical locations in respect of which the DVM system is configured to provide surveillance;

wherein the first client terminal is configured such that, subject to interaction by the operator of the first client terminal with at least one DVM content display object that displays live video data from the first specific camera, an interface object is displayed, the interface object being configured to allow selection of one or more further users by the operator of the first client terminal with whom to share the live video data from the first specific camera;

wherein the first client terminal is configured to receive, subject to interaction by the operator of the first client terminal with the interface object, a selection indicative of the operator of the second client terminal, thereby to define a request to share the at least one DVM content display object that displays live video data from the first specific camera with the operator of the second client terminal; and wherein the second client terminal is configured to, in response to the request, cause the instance of the user interface being rendered at the second client terminal to request a connection to the first camera server, such that the second client terminal becomes configured to display, via a DVM content display object, live video data from the first specific camera, wherein prior to receiving the signal the second client terminal is not receiving live video data from the first camera server, such that the user interface of the second client terminal provides a plurality of simultaneously displayed DVM content display objects, including two or more DVM content display objects previously configured to display live video data from a respective camera in the DVM system, thereby to enable simultaneous real-time surveillance of multiple physical locations in respect of which the DVM system is configured to provide surveillance, and the DVM content display object configured to display live video data from the first specific camera, such that the second client terminal is configured to enables continued simultaneous surveillance of multiple surveillance regions including a surveillance region monitored by the first specific camera.

12. A DVM system according to claim 11 including:
a plurality of camera servers, wherein each camera server is configured to utilize video data from an assigned one or more video streaming units; and
a plurality of video streaming units, wherein each streaming unit is configured to stream, onto a network, video data for a respective camera.

13. A system according to claim 12 wherein the instance of the user interface being rendered at the second client terminal enables the operator of the second client terminal to select one of a plurality of available display objects in which to view the live video data from the first specific camera.

14. A system according to claim 11 wherein the operator of the second terminal selects an on-screen content display object for displaying the live video data from the first specific camera.

15. A system according to claim 11 wherein, by way of the user interface, the operator of the first client terminal is enabled to provide a request to share a specified DVM content item with the operator of the second client terminal and the operators of one or more further client terminals.

16. A tangible non-transitory carrier medium carrying computer executable code that, when executed via one or more processes, allows performance of a method comprising:
providing a user interface, renderable at a plurality of client terminals, for allowing an operator of each client to independently view Digital Video Management (DVM) system content items, wherein the DVM system content items include live video data captured by one or more cameras in the DVM system;

by way of the user interface, allowing an operator of a first client terminal to provide a request to share live video data from a specific camera with the operator of a second client terminal, wherein the live video data from the is obtained by the first client terminal from a first camera server that is configured to make the live video data available over a network;

in response to the received request, providing a signal to the second client terminal such that the second client terminal requests a connection to the first camera server, thereby to begin obtaining the live video data from the first camera server, such that the live video data from the specific camera is made available for viewing via the user interface at the second client terminal; and wherein prior to receiving the signal the second client terminal is:
(i) not receiving live video data from the first camera server; and
(ii) configured to provide a plurality of simultaneously displayed DVM content display objects, wherein each DVM content display object is configurable to display live video data from a respective camera in the DVM system, thereby to enable simultaneous real-time surveillance of multiple physical locations in respect of which the DVM system is configured to provide surveillance; and wherein subsequent to receiving the signal the second client terminal is configured to provide a plurality of simultaneously displayed DVM content display objects, including two or more DVM content display objects previously configured to display live video data from a respective camera in the DVM system, thereby to enable simultaneous real-time surveillance of multiple physical locations in respect of which the DVM system is configured to provide surveillance, and the DVM content display object configured to display live video data from the first specific camera, such that the second client terminal is configured to enable continued simultaneous surveillance of multiple surveillance regions including a surveillance region monitored by the first specific camera.

17. A carrier medium according to claim 16 wherein the signal provided to the second client terminal causes the live video data from the specific camera to be displayed in a content display object of the user interface at the second client terminal.

18. A carrier medium according to claim 16 wherein the operator of the second terminal selects an on-screen content display object for displaying the specified content item.

* * * * *